Aug. 7, 1945.   T. J. HOY   2,381,541
RESILIENT VALVE HEAD
Filed May 5, 1941   2 Sheets-Sheet 2
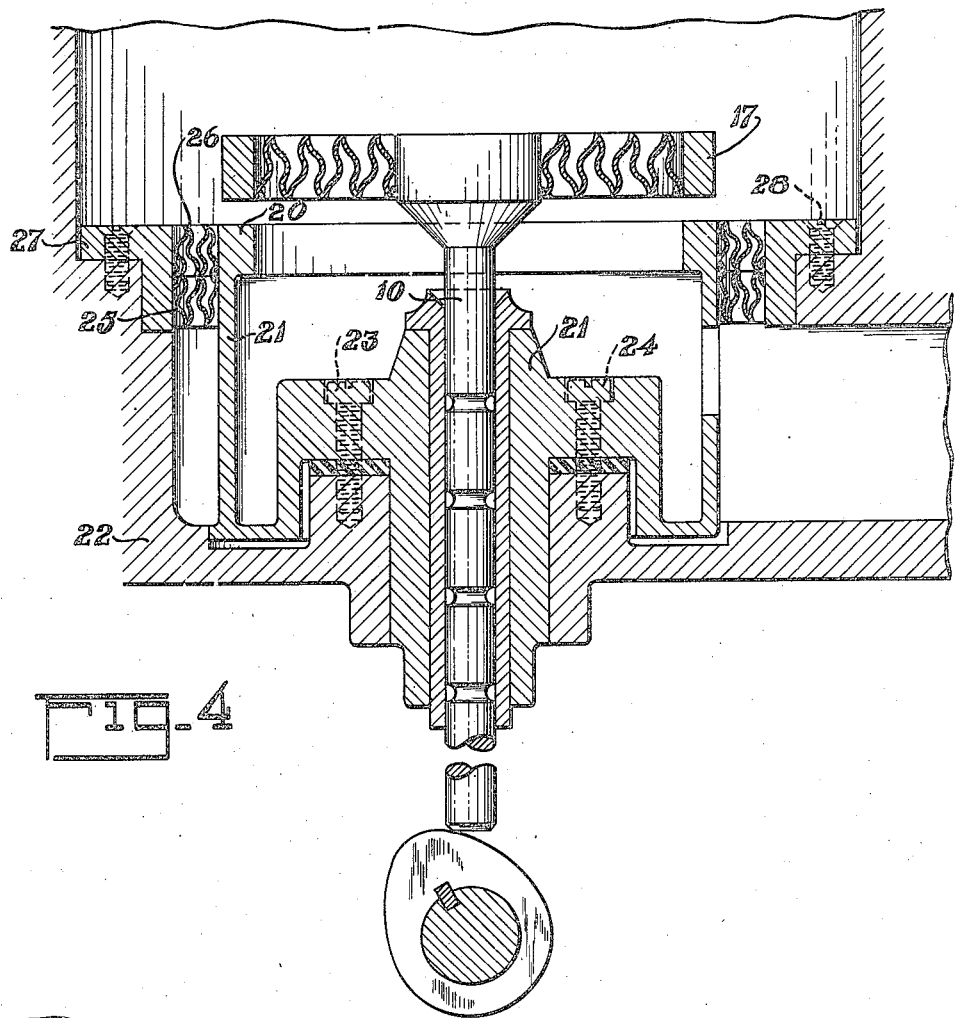
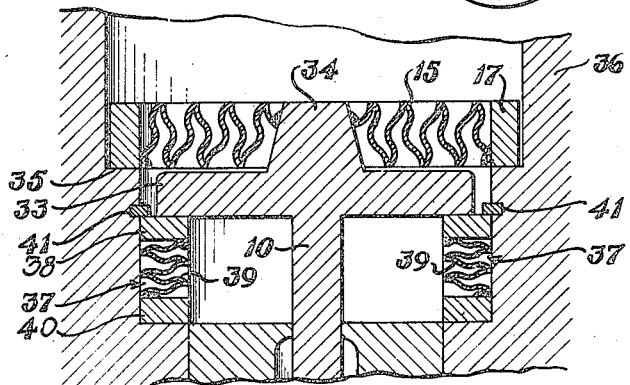
INVENTOR
*Thomas J. Hoy.*
BY
*Richards & Geier*
ATTORNEYS Patented Aug. 7, 1945

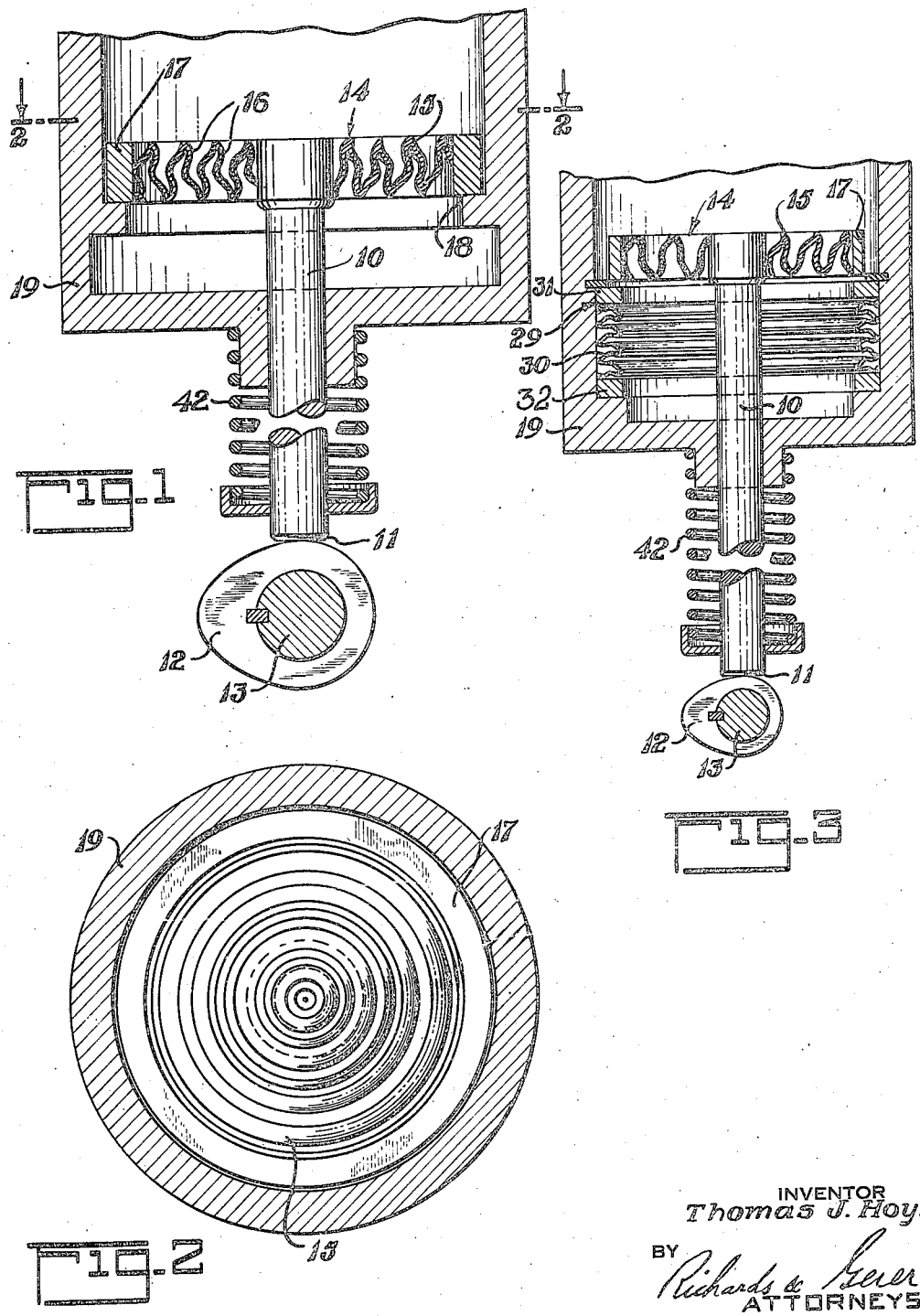

2,381,541

UNITED STATES PATENT OFFICE 2,381,541

RESILIENT VALVE HEAD

Thomas J. Hoy, Newark, N. J.

Application May 5, 1941, Serial No. 391,843

16 Claims. (Cl. 251—27)

This invention relates to a valve construction.

It is usual in valves for internal combustion engines, steam engines and the like to provide a valve having a head of rigid construction, the valve being adapted to cooperate with a fixed valve seat. Such a construction requires that an adjustable tappet be between the valve and the valve actuating cam, so that the proper clearance may be provided between the tappet and the valve stem.

An object of the present invention is to provide a valve construction which obviates the necessity of providing clearance between the valve and the valve actuating cam.

Another object of this invention is to provide a valve having a flexible head, of comparatively thick material.

A further object of this invention is to provide a valve construction in which the seat and the head of the valve may have limited deflections.

A still further object of this invention is to provide a valve construction which will compensate for the wear on the valve actuating cam surface automatically.

Other objects of the invention will become apparent in the course of the following specification.

The above and other objects of this invention may be accomplished by providing a valve having a valve head of a comparatively thick material formed of a plurality of concentric substantially sector-shaped corrugations. The valve head is fastened in the central portion thereof to a valve stem, the periphery thereof being formed of a ring of rigid material adapted to cooperate with the valve seat. The valve seat may be constructed of a ring of rigid material mounted on a bellows-like mounting.

The invention will appear more clearly from the following detailed description when taken in connection with the accompanying drawings, showing by way of example a preferred embodiment of the invention, together with possible modifications thereof.

In the drawings:

Figure 1 is a sectional view taken through the center of a valve construction embodying this invention;

Figure 2 is a plan view taken on the line 2—2 of Figure 1;

Figure 3 is a sectional view of a modification of this invention having a flexible valve head and a flexible valve seat;

Figure 4 is a sectional view of a modification of this invention; and

Figure 5 is a sectional view of a double seated valve embodying this invention.

Like numerals refer to like parts throughout the several views.

The valve of this invention comprises a stem 10, the bottom 11 of which is adapted to be acted upon by a cam 12 actuated by a cam shaft 13.

To the top of the valve stem 10 is mechanically fastened by welding or other mechanical means a valve head 14. The valve head 14 is formed of a disc 15 having a plurality of concentric substantially sector-shaped corrugations 16. The valve stem is preferably fastened to the center of the disc as above set forth.

The periphery of the disc 15, if preferably formed of a rigid ring 17, is welded or otherwise fastened thereto.

In Figure 1 of the drawings, the ring 17 is shown cooperating with a fixed valve seat 18 within a frame 19. Likewise, in Figure 4, the ring 17 is shown adapted to seat on a fixed seat 20. The fixed seat 20 of the construction shown in Figure 4 is positioned at the top of a cage 21 removably positioned in a frame 22 and held therein by means of bolts 23 and 24. Surrounding the valve seat 20 is a channel 25 formed by a bellows-like structure 26, one end of which is fastened to the cage 21 and the opposite end fastened to a ring 27 removably held on the frame 22 by means of bolts 28. The channel 25 is adapted to receive a fluid which flows therethrough and cools the valve seat 20.

The valve 14 is shown as cooperating with a flexible valve seat 29 in Figure 3 of the drawings. The flexible valve seat 29 comprises a bellows-like structure composed of adjacent longitudinally positioned substantially sector-shaped corrugations 30 having a piece of rigid material 31 preferably in the shape of a ring fastened to the top and adapted to act as a valve seat and a like piece of rigid material 32 fastened to the bottom thereof and positioned against movement in the frame 19.

This invention as applied to a double-seated valve is illustrated in Figure 5 of the drawings. The valve stem 10 has positioned on the top thereof a rigid head 33 with a central portion 34 projecting from the top of the head in the central portion thereof. The disc 15 is fastened to the portion 34, the ring 17 being adapted to seat on a fixed seat 35 in a frame 36. The rigid head 33 is adapted to seat upon a flexible valve seat 37 similar in construction to the flexible valve seat shown in Figure 3 of the drawings. The head 33 is adapted to engage a ring 38 of rigid material which is fastened to the top of a bellows-like structure 39 composed of adjacent longitudinally positioned substantially sector-shaped corrugations, the bottom of which are fastened to a ring 40 connected to the frame 36. Abutment means such as a retaining ring 41 limits the upward movement of the flexible valve seat 37.

In the operation of the valve construction of this invention, as the cam 12 rotated by the cam shaft 13 moves through its cycle of operation the ring 17 of the valve head 14 is raised from the seat 18 (Fig. 1) or from the seat 20 (Fig. 4) and returned thereto. The flexibility of the head 14 eliminates the necessity of tappet clearance. Any wear on the cam 12 is also compensated for the flexibility of the head 14. The construction of the flexible head 14 in the form of a disc 15 having a plurality of concentric substantially sector-shaped corrugations 16 makes possible the use of a comparatively heavy or thick material in constructing the disc 15 the flexibility being accomplished through the corrugated construction.

The same desirable results are obtained when the valve head 14 is used in conjunction with a resilient valve seat as shown in Figures 3 and 5 of the drawings. As shown in Figure 3 of the drawings, the ring 17 of the head 14 seats on ring 31 of the flexible valve seat 29 which valve seat is compressible through the corrugations 30.

In the double seated valve construction illustrated in Figure 5 of the drawings, the rigid valve head 33 seats against the resiliency of the valve seat 37 caused by the bellows-like structure 39 while the ring 17 of the flexible disc 15 seats on the fixed seat 35. With such a construction no adjustable tappet is required, since clearance between the valve stem and the cam surface is not required, the flexibility of the construction provided through the flexible valve head and also through the flexible valve seat compensating for the necessity of such clearance. Any wear on the cam surface will automatically be taken up by the resiliency in the valve seat and valve head.

In the embodiments of the invention shown, the valve is raised against the tension of a spring 42, as shown in Figure 1 of the drawings, or against pressure exerted on the face of the valve head, the tension of the spring or pressure, as the case may be, pressing the valve stem against the cam surface and re-seating the valve when the low portion of the cam surface is adjacent the stem. The term "sector-shaped" is used throughout the specification and claims to describe the cross-sectional shape of the corrugations shown in Figures 1, 3, 4 and 5 and represented in cross-section by a succession of sharply angular zeniths and nadirs, a given zenith being joined to the succeeding nadir and that nadir to the succeeding zenith by a curved section of the material forming the corrugation, successive sections being formed integral or joined in any suitable manner.

It is apparent that the specific illustrations shown have been given by way of illustration and not by way of limitation and that the structure above described is subject to a wide modification and variation of equivalents without departing from the scope or intent of the invention, all of which variations and modifications are to be included within the scope of the present invention.

What is claimed is:

1. In a valve, in combination with a valve seat, a valve head formed of substantially rigid material having formed therein at least one corrugation and made flexible thereby, a strip of rigid material on said head, extending around the periphery thereof, said strip being firmly connected to said corrugation and engaging said valve seat to close the valve, said corrugation constituting the sole material between said strip and said stem.

2. In a valve, in combination with a valve seat having a head-engaging surface, a valve stem, and a valve head comprising a strip of rigid material, said strip comprising an inner periphery and a surface adapted to engage said head-engaging surface to close the valve, said head being formed of substantially rigid material, said material comprising at least one corrugation and being rendered flexible thereby, said material extending from said stem only to the said inner periphery to connect said stem to said inner periphery.

3. A valve construction comprising a valve with a head having formed therein at least one substantially sector-shaped corrugation and made flexible thereby, a strip of material on said head extending around the periphery thereof, a resilient valve seat comprising a bellows-like structure fixedly mounted in relation to said valve and composed of substantially sector-shaped corrugations, a seat portion connected to one end of said bellows-like structure and adapted to be engaged by said strip, a valve stem connected to said valve head and actuating means to actuate said stem and move the strip on said head out of engagement with said seat portion against pressure.

A valve construction comprising a valve with a head having formed therein a plurality of concentric substantially sector-shaped corrugations and made flexible thereby, a strip of material on said head extending around the periphery thereof, a resilient valve seat comprising a bellows-like structure fixedly mounted in relation to said valve and longitudinally positioned substantially sector-shaped corrugations, a seat portion connected to one end of said bellows-like structure and adapted to be engaged by the strip on said head, a valve stem connected to said valve head at substantially the center thereof, and means acting on said stem to move the strip on said head out of engagement with said seat portion against pressure.

5. In a double seated valve construction a valve with a valve head of rigid material, a second valve head of greater diameter than said first-mentioned head and mounted thereon above said first-mentioned head, said second valve-head having formed therein a plurality of concentric substantially sector-shaped corrugations and made flexible thereby, a strip of material on said second valve head extending around the periphery thereof, a fixed valve seat adapted to be engaged by said strip of material on said second head, a resilient valve seat comprising a bellows-like structure fixedly mounted in relation to said valve and composed of adjacent longitudinally positioned substantially sector-shaped corrugations, a seat portion connected to one end of said bellows-like structure and adapted to be engaged by the first-mentioned valve head, a valve stem connected to said valve and actuating means to actuate said stem and move the strip on said second valve head and said first valve head out of engagement with their respective seats against pressure.

6. In a valve, a valve seat having a resilient bellows-like structure and an inner operative head-engaging surface, a valve head having a plurality of concentric corrugations and made flexible thereby, a strip firmly connected with said corrugations and closed on itself, said strip having a surface adapted to engage said head-engaging surface of the valve seat to close the valve, a valve stem having an end connected to said valve head, means actuating said valve stem to move said surfaces away from each other and thereby open the valve, and a spring engaging said valve stem and continuously maintaining the other end of said valve stem in engagement with said actuating means due to resiliency of said valve seat.

7. In a valve, a valve seat, a cage carrying said valve seat, a frame, means removably connecting said cage with said frame, a resilient bellows-like structure between said valve seat and said frame, a valve head having a plurality of concentric corrugations and made flexible thereby, a strip firmly connected with said corrugations and closed on itself, said strip having a surface adapted to engage said valve seat to close the valve, and a valve stem connected to said head and extending through said frame.

8. In a valve, a flexible head including a plurality of concentric corrugated elements, each of said corrugated elements being rigid and having a curved middle portion and two end portions situated on opposite sides of said middle portion and being curved in a direction opposite to that of the curvature of said middle portion, one of said elements being connected with an adjacent element along an edge of one end portion and being connected with another adjacent element along an edge of its other end portion.

9. In a valve, a valve seat having an inner head-engaging surface, a valve head comprising one or more flexible concentric corrugations, a rigid strip rigidly connected with said corrugations and closed on itself, said strip having a surface adapted to engage said head-engaging surface of the valve seat to close the valve, a valve stem rigidly connected with said corrugations, said corrugations being exposed to fluid pressure passing through said valve.

10. In a valve, a casing a valve seat located within said casing and having a resilient bellows-like structure and an inner operative head-engaging surface, means connected with said casing for maintaining said resilient bellows-like structure under compression, a valve head having a plurality of concentric corrugations and made flexible thereby, a strip firmly connected with said corrugations and closed on itself, said strip having a surface adapted to engage said head-engaging surface of the valve seat to close the valve, a valve stem having an end connected to one face of said valve head, and means for actuating said valve stem to open and close said valve.

11. In a valve, a valve seat having an inner head-engaging surface, a valve head comprising one or more flexible concentric corrugations, said corrugations comprising concave strips of material superimposed and joined by welding or the like, a rigid strip firmly connected with the outer corrugations and closed on itself, said strip having a surface adapted to engage said head-engaging surface of the valve seat to close the valve, a valve stem firmly connected with the inner corrugations, and means for actuating said valve stem to open and close said valve.

12. In a double seated valve construction, a valve with a valve head of rigid material, a second valve head of greater diameter than the first-mentioned valve head and mounted thereon, the second-mentioned valve head having formed therein at least one flexible corrugation, a strip of material on the second-mentioned valve head and extending around the periphery thereof, a fixed valve seat adapted to be engaged by said strip of material, a resilient valve seat comprising a bellows-like structure fixedly mounted in relation to said valve and a seat portion connected to one end of said bellows-like structure and adapted to be engaged by the first-mentioned valve head.

13. In a control valve construction for steam or the like, a casing having a valve seat formed therein intermediate its ends, a valve stem within said casing, flexible corrugated material firmly connected to said valve stem and extending within and across said casing intermediate its ends, a rigid strip enclosing said flexible corrugated material and firmly connected to the edges thereof, said strip being adapted to engage said valve seat and constituting along with said valve seat the sole closure elements for closing the valve, whereby said flexible corrugated material is exposed to steam pressures on opposite sides of the material, said pressures being balanced when the valve is open.

14. In a control valve construction for steam or the like, a casing having an inner valve seat formed therein, a valve head comprising flexible corrugations formed therein, a strip firmly connected with said corrugations and closed on itself, said strip having a surface adapted to engage said inner valve seat to close the valve, a valve stem connected to said corrugations, said corrugations constituting the sole material between said valve stem and said strip.

15. A corrugated spring valve head construction and the like comprising strips of material which are curved between their longitudinal boundaries in superimposed relation formed into a bellows-like process, the adjacent longitudinal boundaries of two of said strips being joined, and the opposite longitudinal boundary of one of said two strips being joined to the adjacent boundary of a third of said strips, and so on in alternate succession, the innermost strip constituting the seating portion on the valve head construction.

16. A compression spring for valve heads and the like comprising a continuous bellows-like process, said process comprising strips of material curved between their edges, said strips forming relatively sharp angles one with the other, said process being adapted to yield to and resist compressive forces acting along lines substantially perpendicular to the plane of said process, the innermost strip constituting a seating portion on the valve head construction.

THOMAS J. HOY.